April 5, 1927.
R. R. WEST
1,623,820
AUTOMATIC WEIGHING MACHINE
Filed Jan. 3, 1927  4 Sheets-Sheet 1
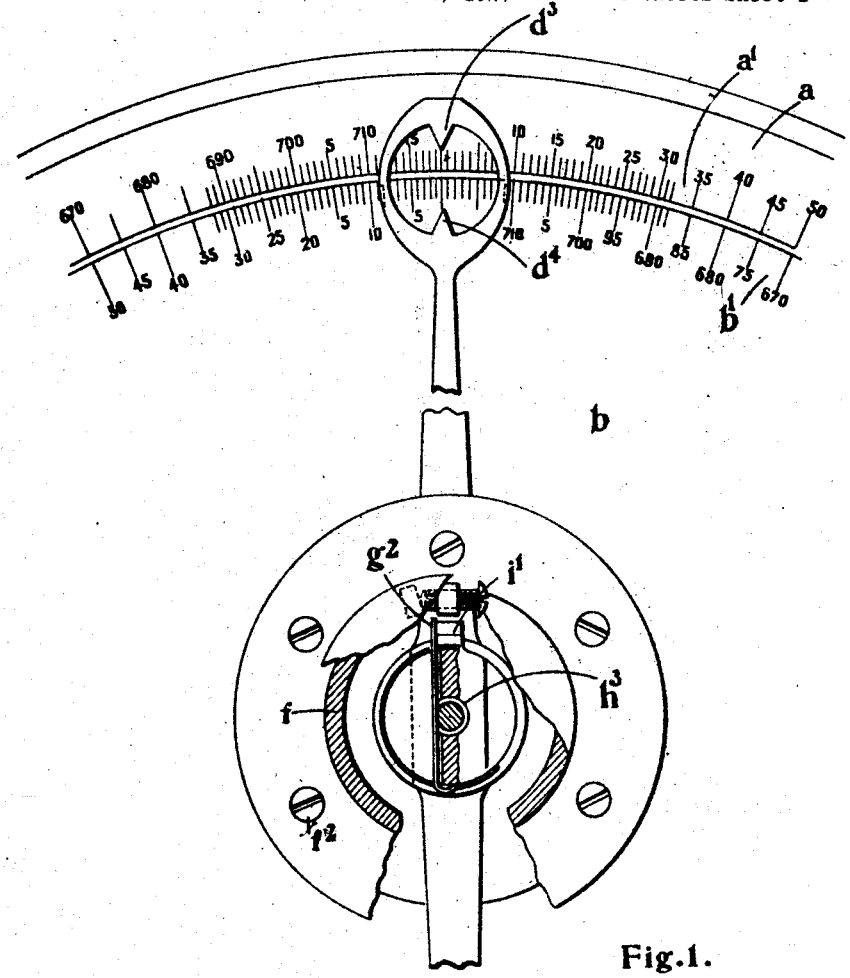
Fig. 1.
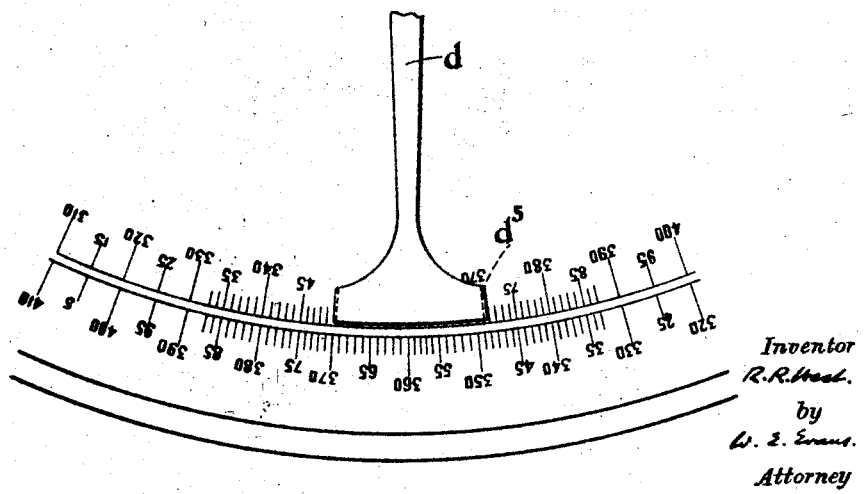
Inventor
R. R. West.
by
W. E. Evans.
Attorney April 5, 1927.  
R. R. WEST  
AUTOMATIC WEIGHING MACHINE  
Filed Jan. 3, 1927  4 Sheets-Sheet 2

Inventor  
R. R. West  
by  
W. E. Evans  
Attorney

April 5, 1927.

R. R. WEST

AUTOMATIC WEIGHING MACHINE

Filed Jan. 3, 1927

Inventor
R. R. West.
by
W. E. Evans
Attorney.

Patented Apr. 5, 1927.

1,623,820

UNITED STATES PATENT OFFICE.

ROGER ROLLESTON WEST, OF NORWOOD, LONDON, ENGLAND.

AUTOMATIC WEIGHING MACHINE.

Application filed January 3, 1927, Serial No. 158,759, and in Great Britain July 28, 1925.

This invention relates to automatic weighing machines of the kind in which means are provided whereby the tare weight, net weight and gross weight may be indicated automatically.

The invention has among its objects to provide an improved construction of such automatic weighing machines and generally to facilitate the weighing of commodities in receptacles or containers.

According to the invention an automatic weighing machine is provided with a stationary scale or pointer, a movable scale or pointer operatively connected to the weighing mechanism, and a freely mounted scale or pointer adapted to be maintained in the zero position while the tare weight is being registered, and to be moved with the scale or pointer connected to the weighing mechanism to indicate the net weight of the commodity. Thus, according to one construction, stationary and rotatable dials are provided, the rotatable dial being connected to the weighing mechanism and the dials being provided with co-operating scales marked or numbered, according to the weight units to be employed, at equi-angular intervals in opposite directions, while a pointer, freely mounted co-axially with the stationary and movable dials, is adapted to give readings on both scales, means being provided whereby the pointer may be maintained in its zero position while the tare weight is being registered and may then be connected to the movable dial so that, when the commodity to be weighed is placed in the receptacle or container and the movable dial is rotated to indicate the weight of the commodity, the pointer is carried with the movable dial and thus indicates the tare and net weights on the scales of the movable and stationary dials respectively, the gross weight being indicated upon the movable dial at the position opposite to the zero point on the stationary dial or upon the stationary dial at a position opposite to the zero point on the movable dial.

According to the invention, moreover, means such as a trigger are provided to release the freely mounted scale or pointer from the scale or pointer, connected to the weighing mechanism and to return the first mentioned scale or pointer to the zero position either when the second mentioned scale or pointer returns to the zero position or at any other time.

According to the invention, moreover, means are provided whereby the freely mounted scale or pointer may be set at a known or determined tare weight previously to the weighing operation.

The invention further comprises the features hereinafter described.

The invention is hereinafter described by way of example with reference to the accompanying diagrammatic drawings, in which—

Figure 1 is a part sectional front elevation of the indicating mechanism of an automatic weighing machine provided according to the invention.

Figure 2:
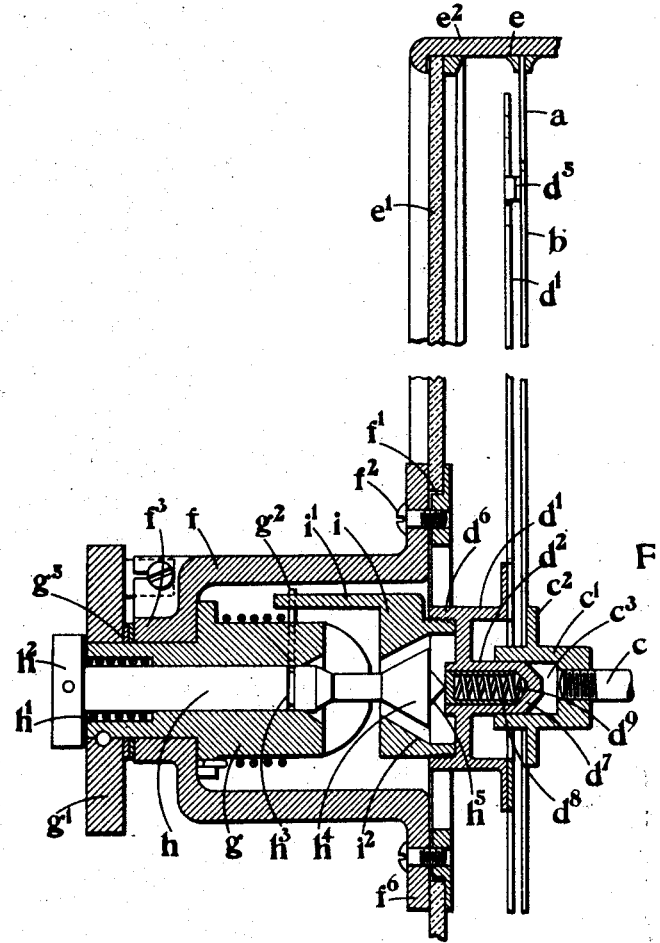
Figure 2 is a part sectional elevation corresponding to Figure 1 showing the parts in the position in which the freely mounted pointer is clutched to the movable dial connected to the weighing mechanism.

In carrying the invention into effect a stationary dial or ring $a$ is provided having a scale $a^1$ numbered or graduated at equi-angular distances in a clockwise direction according to the weight units to be employed. A movable dial $b$ having a similar scale $b^1$ numbered or graduated in an anti-clockwise direction is mounted co-axially with the dial or ring $a$. The movable dial $b$ is mounted upon the spindle $c$ of the weighing mechanism, for example, by such means as a fitting $c^1$ screwed upon the end of the spindle $c$ and having a laterally extending flange $c^2$ on which the dial $b$ is secured in any suitable manner, and a centrally disposed hole or recess $c^3$ in which a boss $d^2$ on a fitting $d^1$ carrying a pointer $d$ is adapted to engage rotatably and slidably. The pointer $d$ extends diametrically across the dial $b$ and at its upper end is provided with a pair of oppositely disposed indicating points $d^3$, $d^4$ which are adapted to co-operate with the respective scales $a^1$, $b^1$ of the stationary and movable dials to indicate the net and tare weights respectively. The pointer $d$ is advantageously also provided at one or both ends in positions adjacent the movable scale $b^1$ with rearwardly extending projections $d^5$ which may be provided with knife edges or otherwise to engage with the usual radially disposed grooves or the like conveniently provided adjacent the periphery of the dial $b$ and constituting the graduations on the movable dial.

The indicating mechanism is mounted within a casing $e$ the front of which is closed by a sheet of glass $e^1$ having a central aperture in front of which is mounted a cylindrical casing $f$ secured in position, for example, by such means as a flanged ring $f^1$ mounted behind the glass and adapted to engage the edge of the said aperture and to be clamped to a flange $f^6$ on the casing by means such as screws $f^2$. The cylindrical casing $f$ is, at its outer end, provided with a boss $f^3$ or the like in which a member $g$ is rotatively mounted, and the member $g$ is provided with a cylindrical bore extending therethrough for the reception of a plunger $h$ which is normally urged outwardly by means of a helical or other spring $h^1$ seated in the member $g$ and is provided at its outer end with a press button $h^2$ or the like for its operation. The member $g$ is provided to extend beyond the outer end of the cylindrical casing $f$ and a knurled or milled head $g^1$ or the like is secured upon the outwardly extending end of the member $g$ for its rotation. The fitting $d^1$ carrying the pointer $d$ is provided with an internally screw-threaded cylindrical recess $d^6$ adapted for the reception of an externally screw-threaded clutch member $i$ provided with an outwardly extending arm or trigger $i^1$, and with a centrally disposed conical seating or clutch surface $i^2$. A helical spring $g^2$ is disposed around the inner part of the member $g$ and has the outer end secured to the said member while a length at the inner end is formed straight and so disposed with reference to the coil as to tend always to take up a substantially diametrical position. The member $g$ has formed in it a lateral slot $g^3$ extending inwardly to the diameter while the plunger $h$ is formed with an annular recess $h^3$ which, when the plunger is pressed inwards to clutch the pointer $d$ to the dial $b$, comes to lie in register with the slot $g^3$. The inner end of the spring $g^2$ may thus enter the slot $g^3$ and the recess $h^3$ and lock the plunger $h$ in the rearward position. The outwardly extending arm or trigger $i^1$ is adapted, when the movable dial $b$ is returned to the zero position, to engage the extremity of the spring $g^2$ and to withdraw the end of the spring from the recess $h^3$ in the plunger $h$, whereby the latter is free to be moved outwardly by the spring $h^1$. Upon the inner end of the plunger $h$ a head, having a conical surface $h^4$ to engage with the corresponding conical seating or clutch surface $i^2$, and an inwardly directed conical point $h^5$ is provided. The fitting $d^1$ carrying the pointer $d$ is provided with a central bore or recess $d^7$ within which a slidably mounted sleeve $d^8$ is provided, the outwardly directed end of the sleeve $d^8$ being closed and being adapted to be engaged by the conical point $h^5$ provided upon the inner end of the plunger $h$, and the sleeve $d^8$ being normally pressed towards the point $h^5$ by means of a helical or other spring $d^9$.

Figure 3:
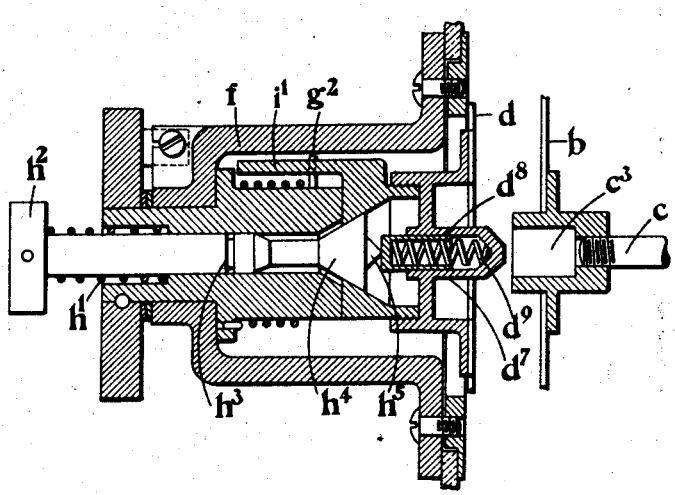
Figure 3 is a similar view to Figure 2 showing the parts in the position in which the freely mounted pointer is released from the movable dial and is in the zero position.

In the zero position of the pointer $d$ and of the movable dial $b$ the parts are in the position shown in Figure 3 in which the plunger $h$ has been released by the trigger $i^1$ and is in its outermost position, the conical head $h^4$ on the end of the plunger $h$ engaging the corresponding conical seating or clutch surface $i^2$ in the clutch member $i$. When it is desired to clutch the pointer $d$ to the movable dial $b$ the push button $h^2$ or the like is pressed in. On the inward movement of the parts the conical head $h^4$ on the end of the plunger $h$ is maintained in engagement with the conical seating or clutch surface $i^2$ in the clutch member $i$ by the action of the spring $d^9$ until the boss $d^2$ on the fitting $d^1$ has entered the centrally disposed hole or recess $c^3$ in the fitting $c^1$ and the projections $d^5$ or knife edges at the ends of the pointer $d$ have engaged with the radial grooves before referred to, the fitting $d^1$ carying the pointer $d$ and the clutch member $i$ being thereafter released from the plunger $h$ and being capable of rotation with respect thereto, but being clutched to the movable dial $b$ by reason of the engagement of the projections $d^5$ in the radial grooves in the movable dial $b$ under the action of the spring $d^9$ acting between the conical point $h^5$ on the end of the plunger $h$ and the fitting $d^1$ carrying the pointer $d$. In this position the spring $g^2$ has entered the groove $h^3$.

When the dial $b$ is returned by the weighing mechanism to the zero position, it carries with it the pointer $d$, the fitting $d^1$ and the clutch member $i$ carrying the trigger $i^1$ and thus on the trigger $i^1$ engaging with the spring $g^2$ the latter is withdrawn from the annular recess $h^3$ in the plunger $h$, whereby the plunger $h$ is returned to its outer position by the spring $h^1$, the pointer $d$, the fitting $d^1$ and the clutch member $i$ being maintained in their inner position by the spring $d^9$ until the conical head $h^4$ on the end of the plunger $h$ engages with the corresponding conical seating or clutch surface $i^2$ in the clutch member $i$, whereupon the pointer $d$ is withdrawn from engagement with the movable dial $b$ which may now be rotated independently of the pointer $d$.

Figure 4:
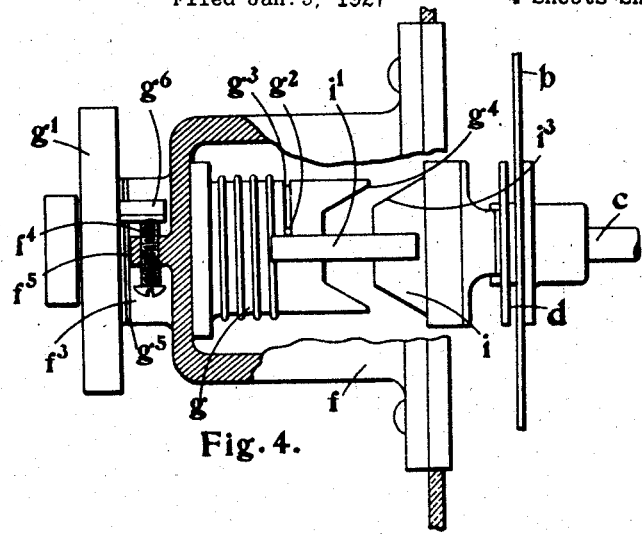
Figure 4 is a part sectional plan view corresponding to Figure 2.

As indicated in Figure 4 the member $g$ is provided at its inner end with a pair of jaws $g^4$ having their inner faces outwardly inclined while the clutch member $i$ is provided with correspondingly inclined faces $i^3$ adapted to engage with the said outwardly inclined faces of the jaws $g^4$ when the respective parts are in the position indicated in Figure 3. By such means the pointer $d$ may be positively returned to the zero position on its release from the movable dial $b$.

Means such as a key and key-way may be provided to prevent relative rotation of the plunger $h$ and the clutch member $g$.

In the operation of the mechanism hereinbefore described, a receptacle or container is placed upon the weighing platform and causes the movable dial $b$ to be rotated by the weighing mechanism in the direction in which the stationary scale $a^1$ is graduated, that is in a clockwise direction in the construction described, to an extent corresponding to the weight of the container, it being understood that the mechanism is in the position indicated in Figure 3, whereby the pointer $d$ is maintained in the zero position and the tare weight is thus registered by the indicating point $d^4$ upon the scale $b^1$ of the movable dial. The press button $h^2$ or the like is then pressed in so that the parts assume the position indicated in Figure 2 wherein the pointer $d$ is clutched to the movable dial $b$. The commodity to be weighed is then placed in the receptacle or container and the movable dial $b$ rotates to a further extent corresponding to the weight of the commodity and carries with it the pointer $d$ so that thus the net weight is registered by the indicating point $d^3$ upon the stationary scale $a^1$. The gross weight is indicated upon the movable scale $b^1$ at the zero point of the stationary scale $a^1$ or upon the stationary scale at the zero point of the movable scale. Thus the gross, net and tare weights are automatically indicated while on the removal of the container and its contents from the weighing platform or the equivalent the parts automatically return to the position illustrated in Figure 3.

The mechanism hereinbefore described may be employed for weighing operations in which a known or determined tare weight is involved, that is to determine the weight of a commodity in a receptacle or container of known weight without the necessity of removing the commodity from the receptacle or container. For this purpose the knurled or milled head $g^1$ mounted upon the outwardly extending end of the part $g$ is rotated in an anti-clockwise direction whereby the pointer $d$ is likewise rotated and thus may be set at a position with respect to the movable dial $b$ corresponding to the known or determined tare weight, means such as a spring washer $g^5$ disposed between the head $g^1$ and the outer end of the casing $f$, or a clamp, being provided to maintain the member $g$ in the position to which it is set. The press button $h^2$ or the like is then pressed inwardly whereby the pointer $d$ is clutched to the movable dial $b$. The receptacle or container is then placed upon the weighing platform or the equivalent and the movable dial $b$ is rotated in a clockwise direction to an extent corresponding to the gross weight but, by reason of the previous setting of the pointer $d$, the indicating points $d^3$, $d^4$ thereon indicate the net and tare weights upon the stationary and movable scales $a^1$, $b^1$ respectively, the gross weight being indicated as before upon the movable scale $b^1$ at the position corresponding to the zero point of the stationary scale $a^1$ or upon the stationary scale $a^1$ at a position corresponding to the zero point of the movable scale $b$. On the removal of the charged container from the platform the movable dial $b$ returns to the zero position and the pointer may be tripped at the position at which it has been set by the member $g$.

In order that the location of the pointer $d$ at the zero position may be facilitated, an adjustable stop is provided consisting of a screw $f^4$ mounted upon an outwardly extending lug or projection $f^5$ upon the casing $f$ and engaging with an inwardly extending lug $g^6$ provided upon the knurled or milled head $g^1$.

Figure 5:
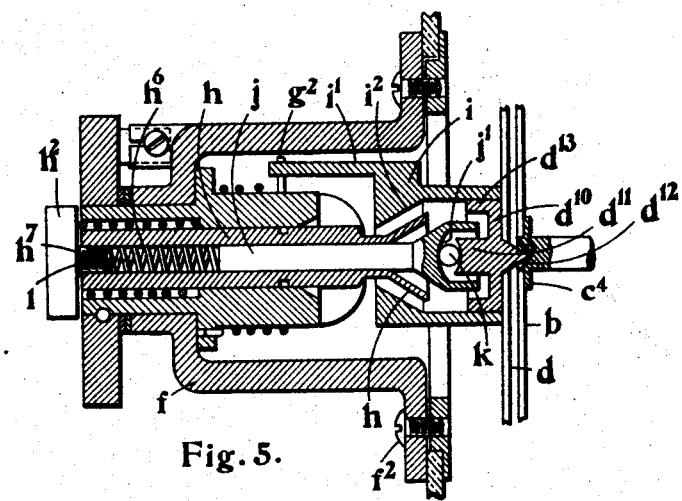
Figure 5 is a part sectional elevation illustrating a modified construction and showing the parts in the position in which the freely mounted pointer is clutched to the movable dial connected to the weighing mechanism.
Figure 6:
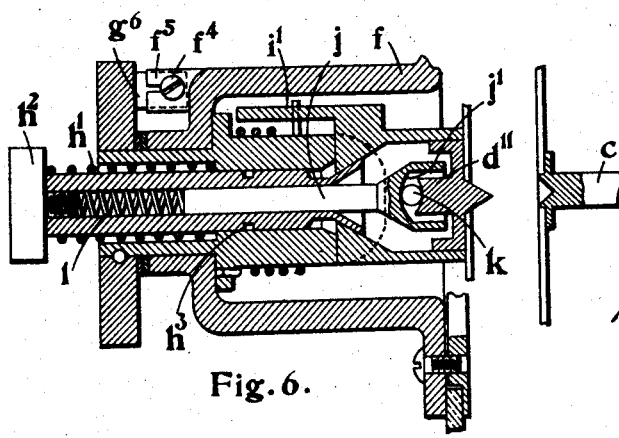
Figure 6 is a part sectional plan view corresponding to Figure 5, but showing the parts in the position in which the freely mounted pointer is released from the movable dial and is in the zero position.

According to a modified construction as illustrated in Figures 5 and 6 of the accompanying diagrammatic drawings, the plunger $h$ may be provided with a central bore $h^6$ for the reception of a slidable rod $j$ having a cup-shaped seating $j^1$ at the end thereof adjacent the pointer $d$, while the pointer $d$ may be secured upon a fitting $d^{10}$ having an oppositely disposed spherical seating $d^{11}$ and an inwardly directed conical point $d^{12}$ adapted to engage within a conical recess $c^4$ in the end of the spindle $c$ of the weighing mechanism, a ball $k$ being disposed and engaged between the cup-shaped seating $j^1$ and the spherical seating $d^{11}$. The fitting $d^{10}$ may be provided with a lateral extending flange $d^{13}$ for the support of the clutch member $i$ carrying the trigger $i^1$, the member $i$ having a conical seating or clutch surface $i^2$ as hereinbefore described. The inner end of the plunger $h$ is provided with a conical head $h^4$ for engagement with the conical seating or clutch surface $i^2$ in the manner before described, the head $h^4$ being conveniently provided with a conical recess to receive the part upon the end of the rod $j$ in which the cup-shaped seating $j^1$ is provided. A helical or other spring $l$, which serves the same purpose as the spring $d^9$ in the construction before described, is provided between the outer end of the rod $j$ and a screw-threaded plug $h^7$ or the like carrying the press button $h^2$. The operation of the mechanism according to this modified construction is as hereinbefore described with reference to Figures 1 to 4.

It will be understood that the mechanism hereinbefore described is applicable to existing weighing machines.

Figure 8:
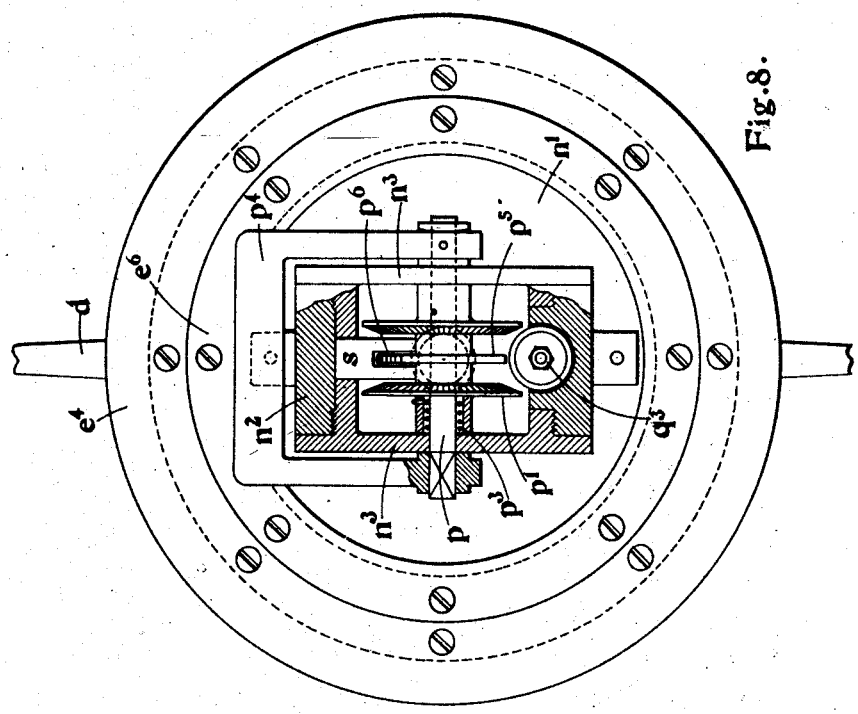
Figure 8 is a part sectional front elevation corresponding to Figure 7.
Figure 7:
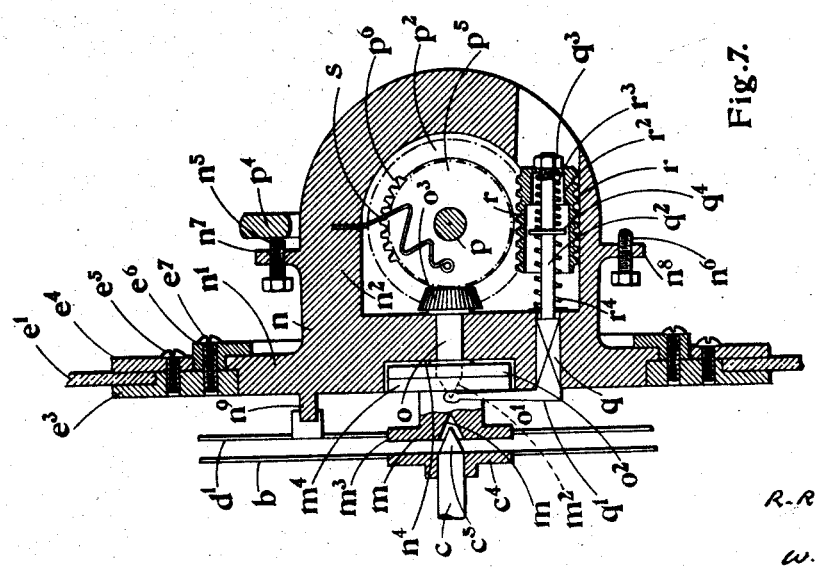
Figure 7 is a part sectional side elevation illustrating a modification.

According to a further modification as illustrated in Figures 7 and 8 of the accompanying diagrammatic drawings, means may be provided whereby the pointer $d$ is clutched to the movable dial $b$ magnetically. For this purpose the pointer $d$ is mounted upon a permanent magnet $m$ which is conveniently cylindrical in form and is provided at the respective ends with centrally disposed conical or other recesses $m^1$, $m^2$ and with flanges $m^3$, $m^4$. The permanent magnet $m$ is adapted to be located alternately upon the conical or other pointed end $c^5$ of the spindle $c$ of the weighing mechanism and the conical or other pointed end $o^1$ of an oppositely disposed spindle $o$. The spindles $c$, $o$ are provided of a non-magnetic substance, such as brass, and the respective spindles carry soft iron discs $c^4$, $o^2$ disposed adjacent the pointed ends of the spindles. The pointed ends $c^5$, $o^1$ of the spindles $c$, $o$ are set apart at a determined distance, such that when the permanent magnet $m$ is clutched magnetically to one disc, the pointed end of the oppositely disposed spindle is disengaged from the corresponding conical or other recess $m^1$ or $m^2$ in the magnet $m$. It will thus be understood that while the permanent magnet $m$ is clutched to one of the discs $c^4$, $o^2$ it is entirely free from, and independently rotatable with respect to, the other disc.

It will be understood that when the permanent magnet $m$ is clutched to the disc $c^4$ the pointer $d$ is maintained in a determined position with respect to the movable dial $b$ and rotates with it, while when the pointer $d$ is de-clutched from the movable dial $b$ it may be returned to the zero position in the manner hereinafter described.

The clutching mechanism and the mechanism for returning the pointer $d$ to the zero position when it is de-clutched from the movable dial $b$ may be mounted within a casing $n$ comprising a circular flange $n^1$ by which it is adapted to be supported within a central aperture in the sheet of glass $e^1$ closing the front of the casing of the weighing mechanism and also comprising a transversely disposed hollow substantially cylindrical part $n^2$, the open ends of which may be closed by end plates or similar closure members $n^3$. The casing $n$ may be provided at the rear with a centrally disposed recess $n^4$ for the accommodation of the soft iron disc $o^2$ upon the spindle $o$, the latter being mounted in a bearing in the casing $n$ and extending into the hollow substantially cylindrical part $n^2$ of the casing, a bevel pinion $o^3$ being mounted upon the end of the spindle $o$. A transversely disposed spindle $p$ extending centrally within the hollow substantially cylindrical part $n^2$ of the casing $n$ is supported in bearings provided in the end plates or closure members $n^3$, and upon the spindle $p$ a pair of oppositely disposed bevel gear wheels $p^1$, $p^2$ are mounted so as to engage with the bevel pinion $o^3$ upon the spindle $o$ upon opposite sides. Each of the bevel gear wheels $p^1$, $p^2$ is mounted upon the spindle $p$ with the interposition of a coil spring clutch $p^3$ adapted to permit rotation of the gear wheel in one direction and to prevent rotation thereof in the other, the clutches for the respective gear wheels $p^1$, $p^2$ being operative in opposite directions so that thus on rotation of the spindle $p$ in either direction the bevel pinion $o^3$ and consequently the spindle $o$ is rotated in a constant direction, such that when the permanent $m$ is clutched to the disc $o^2$ upon the spindle $o$, the pointer $d$ will, on rotation of the spindle $p$, be moved or rotated towards its zero position. Any suitable means may be provided whereby the spindle $p$ may be rotated or oscillated. For example, a U-shaped lever $p^4$ disposed exterior to the part $n^2$ of the casing $n$, may be adapted to engage with the outwardly extending ends of the spindle $p$, which ends may be of square cross-section or may be otherwise provided so that angular movement of the lever $p^4$ is transmitted to the spindle $p$. The lever $p^4$ may be adapted to move about the axis of the spindle $p$ through an angle of approximately 180°, the limits of movement of the lever $p$ being determined by fixed stops $n^5$, $n^6$ which are mounted upon upwardly and downwardly extending lugs or projections $n^7$, $n^8$ upon the part $n^2$ of the casing $n$. The stops $n^5$, $n^6$ may be adjustable. The ratio between the bevel gear wheels $p^1$, $p^2$ and the bevel pinion $o^3$ is such that the angular movement of the lever $p^4$ which is permitted by the stops $n^5$, $n^6$ is sufficient to cause a complete rotation of the spindle $o$, so that thus no matter in what position the pointer $d$ is de-clutched from the movable dial $b$, its return to the zero position on the upward movement of the lever $p^4$ is ensured.

The spindle $p$ also has mounted upon it a disc $p^5$ carrying a toothed sector $p^6$ which is adapted to engage with a rack $r^1$ or the equivalent provided upon the exterior of a hollow cylindrical sleeve $r$ when the lever $p^4$ approaches the lower position, while a flat spring $s$ which may be forked to accommodate the disc $p^5$, may be provided in such manner that the lever $p^4$ is maintained in either of its extreme positions against the stops $n^5$, $n^6$.

In order to move the permanent magnet $m$ axially in one direction or the other to disengage it from the respective soft iron disc $c^4$, $o^2$, a forked arm $q^1$, upon a rod $q$ slidably mounted within a hole in the casing $n$ is adapted to bear against one or other of the flanges $m^3$, $m^4$ upon the permanent magnet. The rod $q$ at the part adjacent the forked arm $a^1$ may be provided of square section or otherwise, so that rotation thereof is prevented, while the rod $q$ is extended to form a part $q^2$ of reduced diameter which extends through the hollow cylindrical sleeve $r$ before referred to. The extremity of the reduced part $q^2$ of the rod $q$ is provided with a nut $q^3$ or other means adapted to engage the end face of the sleeve $r$ so that thus on movement of the lever $p^4$ upwardly, the sleeve $r$ is withdrawn by the toothed sector $p^6$ and the forked arm $q^1$ engages with the flange $m^4$ upon the permanent magnet $m$ whereby the latter is withdrawn from the disc $c^4$ upon the spindle $c$ and the pointer $d$ thereby de-clutched from the movable dial $b$, it being understood that the pointer $d$ is on de-clutching rotated by the spindle $o$ and brought to the zero position as hereinbefore described. In order to disengage the permanent magnet $m$ from the disc $o^2$ and to move it axially in the direction of the disc $c^4$ to clutch the pointer $d$ to the movable dial $b$, means are provided whereby the movement of the sleeve $r$ in the opposite direction may be communicated to the rod $q$. Thus according to one construction the reduced part $q^2$ of the rod $q$ may be provided in a determined position with a transversely extending pin $q^4$ or the equivalent and the sleeve $r$ may be provided with a part $r^2$ of reduced diameter adapted when the sleeve $r$ is moved a determined extent to engage with the pin $q^4$. A spring $r^3$ may be disposed around the reduced part $q^2$ of the rod $q$ between an inwardly extending flange at the end of the sleeve $r$ and the pin $q^4$ so that thus on the positive engagement between the reduced part $r^2$ of the sleeve $r$ and the pin $q^4$ and the consequent release or disengagement of the flange $m^4$ of the permanent magnet $m$ from the disc $o^2$ upon the spindle $o$, the rod $q$, the forked part of which it will be understood is bearing against the inner face of the flange $m^3$ of the permanent magnet, is thrown over by the action of the spring $r^3$ to cause the immediate engagement of the magnet $m$ with the disc $c^4$ upon the spindle $c$. A light spring $r^4$ may be disposed around the reduced part $q^2$ of the spindle $q$ in position between the pin $q^4$ and the inner wall of the part $n^2$ of the casing $n$ for the purpose of returning the rod $q$ and the sleeve $r$ to their determined positions when the lever $p^4$ has been raised and the toothed sector $p^6$ is disengaged from the rack $r^1$ or the equivalent upon the sleeve $r$. It will be understood that the movement of the rod $q$ may be effected positively without the interposition of the springs $r^3$, $r^4$.

The zero position of the pointer $d$ is determined by means of a stop $n^9$ projecting from the rear face of the casing $n$ adapted to engage with a similar projection upon the pointer $d$, the respective projections being conveniently formed with knife edges in the radial direction in order that in the unlikely event of their being exactly opposite at the moment of de-clutching, they would not stick one upon the other. It will be understood that in the clutched position of the pointer $d$ the projections forming the stop do not come into engagement and thus any given tare weight may be permanently indicated.

The flange $n^1$ of the casing $n$ may be held between an annular ring $e^3$ adapted at its outer end to engage the glass $e^1$ and an oppositely disposed annular ring $e^6$ which is secured thereto by means of screws $e^7$ or the equivalent, while a flat annular ring $e^4$ is fitted upon the front and secured to the ring $e^3$ by means of screws $e^5$. The casing $n$ is held by the ring $e^6$ in such manner that it may be rotated about the axis of the spindle $o$ for the purpose of setting the apparatus to any predetermined tare weight, the casing $n$ being simply turned about the axis of the spindle $o$ to the desired position.

It will be understood that the invention is not limited to the details of construction hereinbefore described. Thus the ends $c^5$, $o^1$ of the spindles $c$, $o$, may be adapted to engage with the corresponding recesses $m^1$, $m^2$ in the permanent magnet $m$, in such manner that the outer faces of the flanges $m^3$, $m^4$ of the magnet do not actually come into contact with the adjacent faces of the discs $c^4$, $o^2$ respectively.

I claim:

1. An automatic weighing machine adapted to indicate tare and net weights, comprising a stationary scale, a movable indicating member connected to the weighing mechanism and co-operating with the said stationary scale to give indications of the weight applied, a freely mounted indicating member also co-operating with the said stationary scale, means for maintaining the said freely mounted member in the zero position while the tare weight is being registered, and means for causing the said freely mounted member to be moved with the said movable member connected to the weighing mechanism to indicate the net weight, substantially as described.

2. An automatic weighing machine adapted to indicate tare and net weights, comprising a stationary scale, a movable indicating member connected to the weighing mechanism and co-operating with the said stationary scale to give indications of the weight applied, a freely mounted indicating member also co-operating with the said stationary scale, means for maintaining the said freely mounted member in the zero position while the tare weight is being registered, means for causing the said freely mounted member to be moved with the said movable member connected to the weighing mechanism to indicate the net weight, and means comprising a trigger by which the said freely mounted member is automatically released from the said movable member connected to the weighing mechanism on the removal of the weight applied, substantially as described.

3. An automatic weighing machine adapted to indicate tare and net weights, comprising a stationary scale, a movable indicating member connected to the weighing mechanism and co-operating with the said stationary scale to give indications of the weight applied, a freely mounted indicating member also co-operating with the said stationary scale, means for maintaining the said freely mounted member in zero position while the tare weight is being registered, means for causing the said freely mounted member to be moved with the said movable member connected to the weighing mechanism to indicate the net weight, means comprising a trigger by which the said freely mounted member is automatically released from the said movable member connected to the weighing mechanism on the removal of the weight applied, and means by which the said freely mounted member is returned to the zero position independently of the said movable member connected to the weighing mechanism, substantially as described.

4. An automatic weighing machine adapted to indicate tare and net weights, comprising a stationary scale, a movable indicating member connected to the weighing mechanism and co-operating with the said stationary scale to give indications of the weight applied, a freely mounted indicating member also co-operating with the said stationary scale, and means for clutching the said freely mounted member to the said movable member connected to the weighing mechanism to indicate a predetermined tare weight, substantially as described.

5. An automatic weighing machine adapted to indicate tare and net weights, comprising a stationary scale, a movable indicating member connected to the weighing mechanism and co-operating with the said stationary scale to give indications of the weight applied, a freely mounted indicating member also co-operating with the said stationary scale, means for maintaining the said freely mounted member in the zero position while the tare weight is being registered, and magnetic means for causing the said freely mounted member to be clutched to and to be moved with the said movable member connected to the weighing mechanism to indicate the net weight, substantially as described.

6. An automatic weighing machine adapted to indicate tare and net weights, comprising a stationary circular scale, a rotatable indicating member connected to the weighing mechanism and co-operating with the said stationary circular scale to give indications of the weight applied, a plunger disposed co-axially with the said rotatable member, and mounted so as to be capable of sliding axially, the plunger having a head at the end adjacent the said rotatable member, a spring acting to press the said plunger away from the said rotatable member, a loosely mounted rotatable part disposed co-axially with the said rotatable member, a pointer carried by the said loosely mounted rotatable part, a seating upon said loosely mounted rotatable part adapted to engage the head upon the said plunger, whereby the said pointer is normally held away from the said rotatable member, means comprising a spring pressed sleeve disposed within a co-axial recess in the said loosely mounted rotatable part and engaging the end of the said plunger to press the said loosely mounted rotatable part towards the said rotatable member connected to the weighing mechanism, means upon the said pointer for engaging the said rotatable member when the said plunger is pressed towards the said rotatable member, means for positioning the said loosely mounted rotatable part concentrically with the said rotatable member when the said seating is disengaged from the head upon the said plunger, means comprising a trigger by which the said plunger is held in position in which the pointer is clutched to the said rotatable member and by which the pointer is automatically released from the said rotatable member connected to the weighing mechanism on the removal of the weight applied, and means comprising stationary inclined jaws engaging with correspondingly inclined parts upon the said loosely mounted rotatable part whereby the said pointer is returned automatically to the zero position on the release of the said pointer from the said rotatable member, substantially as described.

7. An automatic weighing machine adapted to indicate tare and net weights, comprising a stationary circular scale, a rotatable indicating member connected to the weighing mechanism and co-operating with the said stationary circular scale to give indications of the weight applied, a plunger disposed co-axially with the said rotatable member, and mounted so as to be capable of sliding axially, the plunger having a head at the end adjacent the said rotatable member, and having an axial bore, a spring acting to press the said plunger away from the said rotatable member, a loosely mounted rotatable part disposed co-axially with the said rotatable member, a pointer carried by the said loosely mounted rotatable part, a seating upon said loosely mounted rotatable part adapted to engage the head upon the said plunger, whereby the said pointer is normally held away from the said rotatable member, a rod slidably mounted within the axial bore in the said plunger, means upon the end of said rod for pivotally engaging said loosely mounted rotatable part, a spring engaging the opposite end of the said rod and pressing the said rod towards the said rotatable member connected to the weighing mechanism, means positioning the said loosely mounted rotatable part concentrically with the said rotatable member when the said seating is disengaged from the head upon the said plunger, means comprising a trigger by which the said plunger is held in the position in which the pointer is clutched to the said rotatable member and by which the pointer is automatically released from the said rotatable member connected to the weighing mechanism on the removal of the weight applied, and means comprising stationary inclined jaws engaging with correspondingly inclined parts upon the said loosely mounted rotatable part whereby the said pointer is returned automatically to the zero position on the release of the said pointer from the said rotatable member, substantially as described.

8. An automatic weighing machine adapted to indicate tare and net weights, comprising a stationary scale, a movable indicating member connected to the weighing mechanism and co-operating with the said stationary scale to give indications of the weight applied, a freely mounted magnet, a pointer mounted upon the said magnet and also co-operating with the said stationary scale, a magnetic part mounted concentrically upon the said rotatable member in position in front of the said magnet, a spindle disposed concentrically with the said rotatable member, a second magnetic part mounted upon one end of the said spindle and disposed at the rear of the said magnet, a shaft disposed transversely to the axis of the said spindle, an operating lever fixed upon the said shaft, a slidably mounted part disposed with its axis parallel to the axis of the said spindle, a rack mounted upon the said slidably mounted part, a pinion mounted upon the said shaft and engaging with the said rack, means carried by the said slidably mounted part and engaging with the said magnet so that on movement of the said slidable part in one direction the magnet is thrown into engagement with the magnetic part carried by the said rotatable member whereby the said pointer is clutched to the said rotatable member while on movement of the said slidable part in the other direction the said magnet is thrown into engagement with the second magnetic part, whereby the pointer is clutched to the said spindle, a bevel pinion mounted upon the rear end of the said spindle, oppositely disposed bevel gear wheels rotatably mounted upon the said transversely disposed shaft and engaging with the said bevel pinion on opposite sides, means for clutching the said bevel gear wheels to the said shaft whereby on angular movement of the said shaft the said bevel pinion is rotated in a constant direction to return the said pointer to the zero position, and means comprising a stop by which the zero position of the said pointer is determined, substantially as described.

ROGER ROLLESTON WEST.